US 6,571,196 B2

(12) United States Patent
Kosuge (10) Patent No.: US 6,571,196 B2
(45) Date of Patent: May 27, 2003

(54) SIZE INSPECTION/MEASUREMENT METHOD AND SIZE INSPECTION/MEASUREMENT APPARATUS (75) Inventor: Shogo Kosuge, Tachikawa (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 09/725,243

(22) Filed: Nov. 29, 2000

(65) Prior Publication Data

US 2001/0002462 A1 May 31, 2001

(30) Foreign Application Priority Data

Nov. 29, 1999 (JP) .......................................... 11-337033

(51) Int. Cl.⁷ ........................... G01B 11/24; G01B 13/16
(52) U.S. Cl. .................................................... 702/167
(58) Field of Search ................................. 702/159, 167, 702/155; 356/2, 625, 237.1, 237.2, 237.3, 237.4, 237.5; 382/278, 144, 149, 151, 152

(56) References Cited

U.S. PATENT DOCUMENTS

| | | | | |
|---|---|---|---|---|
| 5,682,198 A | * | 10/1997 | Katayama et al. | 348/47 |
| 5,717,204 A | * | 2/1998 | Meisburger et al. | 250/310 |
| 5,982,921 A | * | 11/1999 | Alumot et al. | 382/145 |
| 6,047,083 A | * | 4/2000 | Mizuno | 382/141 |
| 6,067,153 A | * | 5/2000 | Mizuno | 356/237 |
| 6,191,850 B1 | * | 2/2001 | Chiang | 356/237.4 |
| 6,246,472 B1 | * | 5/2001 | Yoda et al. | 356/237.2 |
| 6,259,960 B1 | * | 7/2001 | Inokuchi | 700/110 |
| 6,314,212 B1 | * | 11/2001 | Womack et al. | 382/286 |
| 6,347,150 B1 | * | 2/2002 | Hiroi et al. | 382/149 |

OTHER PUBLICATIONS

Hamada, T., Automated pattern inspection system for PCB photomasks using design pattern comparison method., Industrial Electronics Society, 1990.IECON 1990., Nov. 27–30, 1990, pp. 780–785 vol. 1.*

* cited by examiner

Primary Examiner—John Barlow
Assistant Examiner—Demetrius R. Pretlow
(74) Attorney, Agent, or Firm—Antonelli, Terry, Stout & Kraus, LLP (57) ABSTRACT In a size inspection method and a size inspection apparatus, even when a measurement object has a contour having sizes not to be easily measured and having a contour not to be easily determined, the contour and the sizes can be determined. A contour of the inspection or measurement object is detected, and positions detected are registered to constitute a group of registered positions. At measurement or inspection, a comparison is conducted with the group of registered positions in a measurement direction to extract correlation data within a measurement range. A position having highest correlation with the group of registered positions is set as a position on one side of a size measurement location. Resultantly, sizes are measured and a contour is inspected.

11 Claims, 10 Drawing Sheets

LUMINANCE-PIXEL CHARACTERISTIC

| HORIZONTAL ORDER m | 1 | 2 | 3 |
|---|---|---|---|
| CONTOUR POSITION Sm | 5.5 | 3.2 | 2.8 |

| HORIZONTAL POSITION h | 0 | 1 | 2 | 3 | 4 | 5 | 6 | 7 |
|---|---|---|---|---|---|---|---|---|
| CONTOUR POSITION Dm | 8 | 8 | 5.5 | 3.2 | 2.8 | 2.7 | 2.65 | 2.6 |

| h' | 0 | 1 | 2 | 3 | 4 | 5 | 6 | 7 | TOTAL (CORRELATION) |
|---|---|---|---|---|---|---|---|---|---|
| A1 | 2.5 | 4.8 | 2.7 | | | | | | 10 |
| A2 | | 2.5 | 2.3 | 0.4 | | | | | 5.2 |
| A3 | | | 0 | 0 | 0 | | | | 0 |
| A4 | | | | 2.3 | 0.4 | 0.1 | | | 2.8 |
| A5 | | | | | 2.7 | 0.5 | 0.15 | | 3.35 |
| A6 | | | | | | 2.8 | 0.55 | 0.2 | 3.55 |

MAP OF |Sm-Dm|

LEFT SIDE

SIZE INSPECTION/MEASUREMENT METHOD AND SIZE INSPECTION/MEASUREMENT APPARATUS

BACKGROUND OF THE INVENTION

The present invention relates to a method of and an apparatus for inspecting or measuring a size of an object in a contactless manner using, for example, a two-dimensional sensor such as a video camera, and in particular, to a size inspection or measurement method and a size inspection or measurement apparatus suitable for inspecting or measuring an object using an image thereof enlarged by, for example, an optical microscope.

Figure 2:
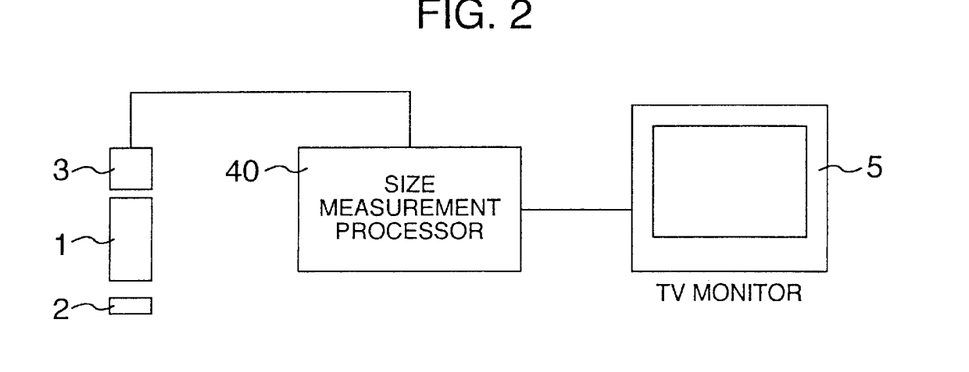
FIG. 2 is a block diagram showing a size inspection/measurement apparatus of the prior art.

For example, JP-B-6-103168 describes a basic configuration of a size inspection/measurement apparatus. In the apparatus, as can be seen from FIG. 2, an image of an object 2 projected by an optical microscopy 1 is picked up by a video camera 3. A size measurement processor 40 electrically measures sizes of desired sections of the image obtained by the video camera 3. The image and values of sizes of the object 2 are displayed on a video monitor 5.

Figure 3:
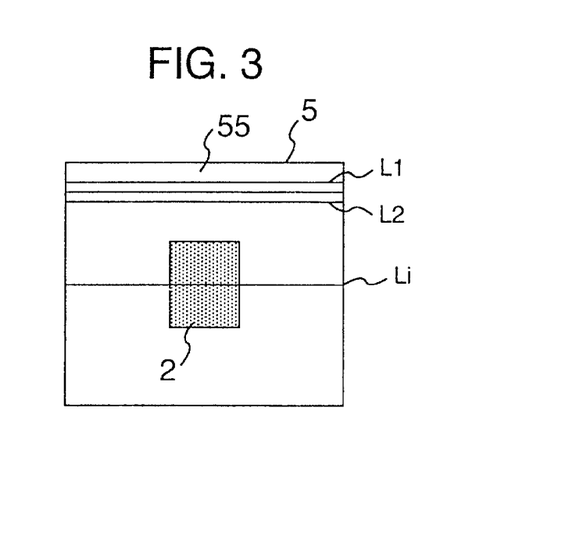
FIG. 3 is a diagram useful to explain operation of the apparatus shown in FIG. 2.
Figure 4:
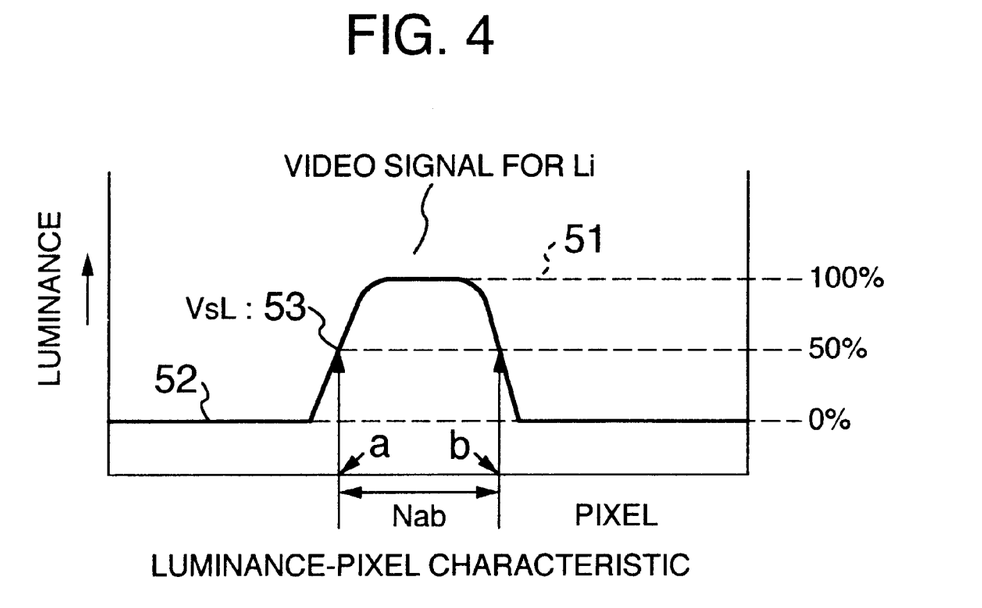
FIG. 4 is a diagram for explaining operation of the apparatus shown in FIG. 2.

FIG. 3 shows an example of an image displayed on a screen of the video monitor 5 during the size measurement. L1 to Li indicate scanning lines. As shown in FIG. 3, for each horizontal scanning line Li of an image 55 of the object 2 picked up by the video camera 3 and displayed on the video monitor 5, a luminance-pixel characteristic is obtained for each pixel position determined by dividing a video signal of the scanning line Li by N and according to luminance of the pixel position. FIG. 4 shows a graph of the luminance-pixel characteristic in which an ordinate indicates luminance and an abscissa indicates pixel positions. The sizes are obtained according to the characteristic in a processing method of the prior art. In the luminance distribution of FIG. 4, a maximum luminance level 51 and a minimum luminance level 52 are assumed to be 100% and 0%, respectively. A positional difference Nab between an a-th pixel and a b-th pixel, which each correspond to a luminance level Vsl of 50% of the maximum luminance level 51, is obtained. The positional difference Nab is multiplied by a coefficient k determined according to a magnification factor of the microscope 1 and a distance between the video camera 3 and the object 2 to obtain a value of size X of the object 2. Namely, X=K·Nab is calculated.

The technique of the prior art has been employed to measure width of a line. That is, as can be seen from FIG. 3, the object of which sizes are to be measured is clear and hence a width of the object 2 can be obtained. Therefore, by setting an upper limit value and a lower limit value to the size, acceptability of the object to be measured can be determined, that is, good/bad decisign of the object can be made. In the prior art example, it is assumed that a contour of the object is vertical to the measuring direction.

Figure 5:
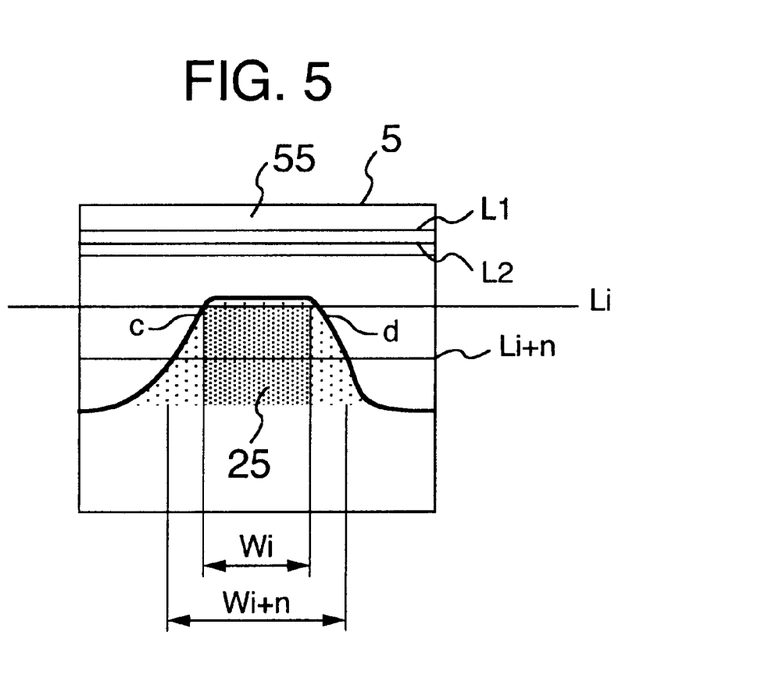
FIG. 5 is a graph for explaining problems of a size measurement method of the prior art.

However, in a case in which the object 25 has rounded corners as shown in FIG. 5 or in which the image is obscure because the optical microscope is used with a magnification factor near its limit, when it is desired to determine by the apparatus whether or not its size is in a range of predetermined values or whether or not its contour is acceptable, measurement of sizes of the object 25 and determination of acceptability of the contour of the object 25 become difficult for the following reasons.

When it is desired to measure length, for example, from a corner c to a corner d of the object 25, it is difficult to identify a scanning line to measure the length between the corners and the measurement is attended with a large amount of error. As can be seen from FIG. 5, it can be appreciated that line width Wi measured using the scanning line Li is less than line width Wi+n measured using the scanning line Li+n. That is, between Wi measured by assuming that angles c and d are on the scanning line Li and Wi+n measured by assuming that angles c and d are on the scanning line Li, an error of Wi−Wi+n appears.

Even if n is assumed to be one, the error for one scanning line takes place easily when the object 25 is moved only by slight vibration of the measurement apparatus.

SUMMARY OF THE INVENTION

It is therefore an object of the present invention to provide a size inspection or measurement method and a size inspection or measurement apparatus which can measure sizes of an object of which a measurement position is not easily determined and which can determine acceptability of the contour of the object.

To achieve the object, there is provided a size inspection or measurement method according to one aspect of the present invention including a step, in a teaching stage, of inspecting an acceptable or good item or of detecting a contour of an object to be measured and a step of registering positions of the contour detected and thereby preparing reference contour positions registered. In the inspection or the measurement, the reference registered positions are compared with positions of a contour of an inspection or measurement object and then positions having highest correlation with the reference registered positions are set as contour positions of a size measurement location. For example, contours of reference angles are beforehand registered. In the measurement of an inspection object, a position having highest correlation with respect to the registered contour of angle is detected and is set as a position of an angle and another angle is detected in a similar fashion to inspect or to measure a size between these angles.

BRIEF DESCRIPTION OF THE DRAWINGS

The foregoing and other objects, features, and advantages of the present invention will be apparent from the following more particular description of the embodiments of the invention as illustrated in the accompanying drawings wherein.

DESCRIPTION OF THE EMBODIMENTS

First, the principle of the present invention will be described in detail. Assume that the measurement direction of the object to be measured is set to, for example, an x-axis direction. In a predetermined registration range, there is detected a contour (i.e., coordinates) in an y-axis direction of a reference item or object, i.e., an acceptable item for respective x coordinate values in a teaching stage. Positions of pixels thus detected are registered as a group of contour positions into a registration device. In a measurement or inspection stage, the registered pixels are compared with the contour (coordinates) in the y-axis direction for the respective x coordinate values of the measurement object to thereby extract data of correlation within a predetermined measurement (inspection) range. A position having highest correlation is determined as a position of an angle for the size measurement. This is conducted for an angle at a right side of the measurement object and for an angle at a left side thereof. The predetermined measurement (inspection) range (area) is beforehand set to a range (area) which includes the predetermined registration range and which is larger than the predetermined registration range.

Figure 6A:
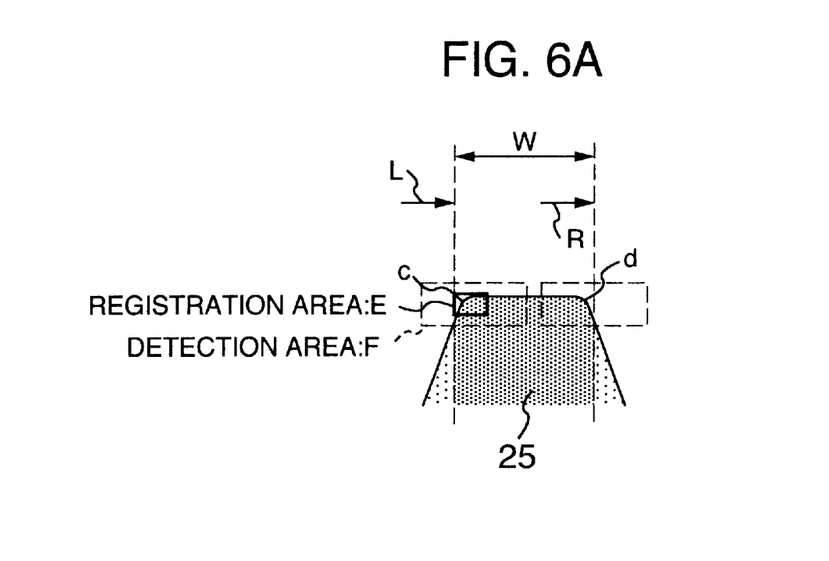
FIGS. 6A and 6B are diagrams for explaining a principle of a size measurement method of the present invention.
Figure 6B:
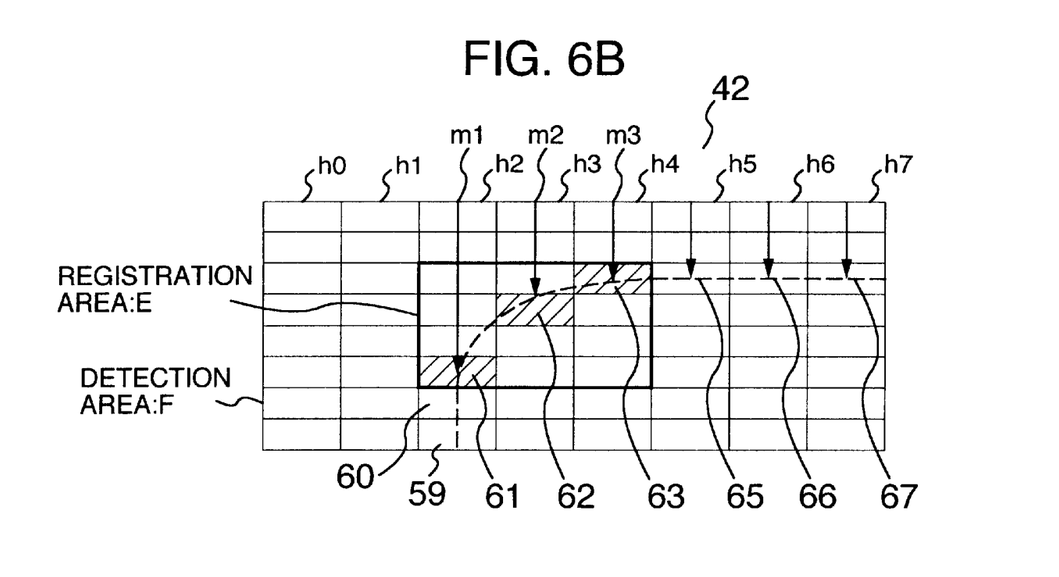

The principle of the present invention will be further described by referring to FIG. 5 and FIGS. 6A and 6B.

FIGS. 6A and 6B show detection of angles c and d of the object 25 shown in FIG. 5.

First, the angle c of the object 25 will be described. For a registration range E, a contour of an acceptable or good object is registered. FIG. 6B shows a magnified view of a section of the angle c in FIG. 6A. One rectangle of FIG. 6B corresponds to one pixel of a video camera. Next, in a measurement stage, correlation is obtained between image data in a detection range (area) and an image in the registration range E. A position having high correlation is set as a position of the angle c of the object. The same operation is conducted also for the angle d.

In the present invention, according to information on distance between particular sections (e.g. corners), whether or not a distance between particular sections of an object is equal to a predetermined distance can also be determined.

Next, an embodiment of the present invention will be described by referring to the drawings. In the drawings, the same members are assigned with the same reference numerals.

Figure 1:
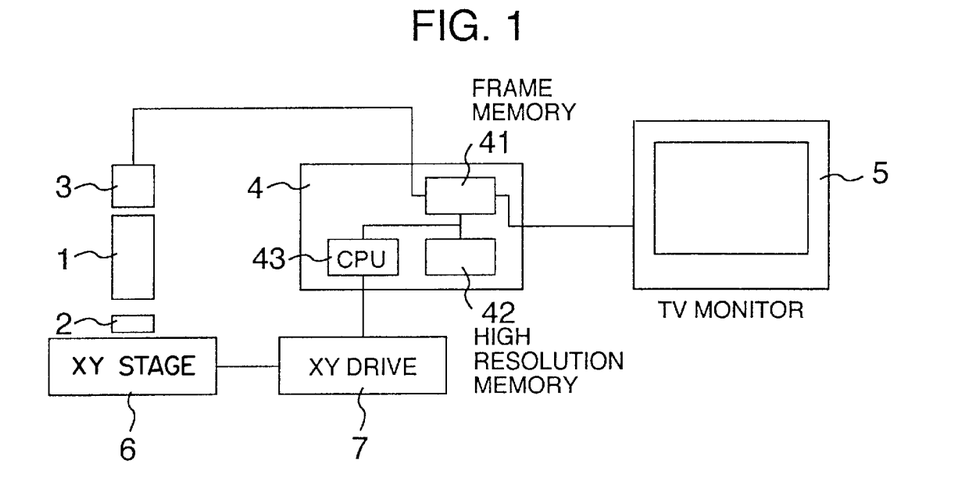
FIG. 1 is a block diagram showing an embodiment of a size inspection or measurement apparatus according to the present invention.

FIG. 1 shows in a block diagram an embodiment of a size inspection or measurement apparatus of the present invention. The configuration of the diagram includes a decision or judge (size measurement) processor 4 including a frame memory 41, a high-resolution memory 42 and a central processing unit (CPU) 43. Further, an xy stage 6, an xy driver 7, and an inspection object 2 are provided. In response to a signal from the CPU 43, the xy driver 7 drives xy stage 6 to move the object 2 to an appropriate position for an optical microscope.

As above, the processor 4 includes the frame memory 41, the high-resolution memory 42 containing data generated according to contents of the frame memory 41, and the CPU 43. Since resolution of the correlation is in the pixel unit including a virtual pixel, the high-resolution memory 42 is disposed to improve the resolution. In the example of the embodiment, the frame memory 41 has a capacity associated with the number of pixels of a camera as (H) 640 pixels X (V) 512 pixels X (C) 8 bits, where H, V, C indicate the horizontal, vertical, and luminance directions, respectively. The high-resolution memory 42 is also disposed to store virtual pixels inserted between adjacent pixels to indicate intermediate luminance therebetween.

The high-resolution memory 42 includes (H) 1279 pixels X (V) 1023 pixels X (C) 8 bits, where H, V, C indicate the horizontal, vertical, and luminance directions, respectively. These memories store reference image data in the teaching stage and data of an object to be measured. These memories are used during the comparison processing.

1. Reference Pattern Registration

First, an acceptable or good pattern which is called a reference pattern is registered using a model sample. The registration will be described by referring to FIGS. 6A and 6B. Using a mouse, not shown, the user registers the reference pattern by personally checking an image on the monitor.

The CPU 43 instructs the xy driver 7 to move the xy stage 6 so that an object to be measured enters a field of view of the optical microscope 1.

An image projected by the microscope 1 is picked up by the video camera 3 and is fed to the size measurement processor 4. The processor 4 sends a signal of the image to the video monitor 5. The monitor 5 displays an image on its screen. After the size measurement, the CPU 43 instructs the xy driver 7 to move the xy stage 6 to measure a subsequent object. Thereafter, the user conducts operation by watching images on the screen of the monitor 5.

To register a detection range or area F larger than the registration range or area E, the user first clicks the mouse button at a starting point (an upper-left corner of an angle section as an object of inspection) on the screen and drags the mouse to an end point (typically, a lower-right corner of the inspection object) and then releases the mouse button. The detection range F (i.e., an inspection window) shown in FIG. 6 is thus registered. Subsequently, the user similarly operates the mouse to register the registration range E (which is within the range F and is indicated by E) in almost the same procedure as for the detection range F. The setting is conducted for right and left corners. For simplification of the drawings, the registration range E is not remarkably different in size from the detection range F in FIGS. 6A and 6B. However, the detection range F is often quite larger than the registration range E in ordinary cases unless there exists another image similar to an image displayed in the detection range F. For example, in an extreme case, the detection range F is the entire range of the view of the camera. It is essential that the detection range F be set to include a location to be measured on the inspection object.

Next, description will be given of registration of a contour of the reference pattern object. This is achieved by extracting a contour of an image picked up.

In the registration range E, a line of the contour is represented by pixels 61 to 63 indicated by shaded sections in FIG. 6B.

Figure 8:
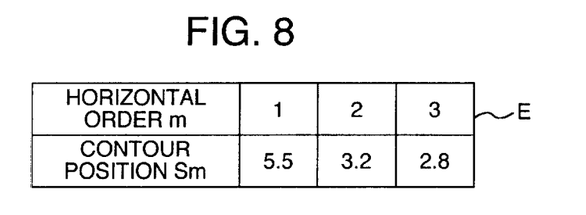
FIG. 8 is a table for explaining the embodiment of FIG. 1.
Figure 13:
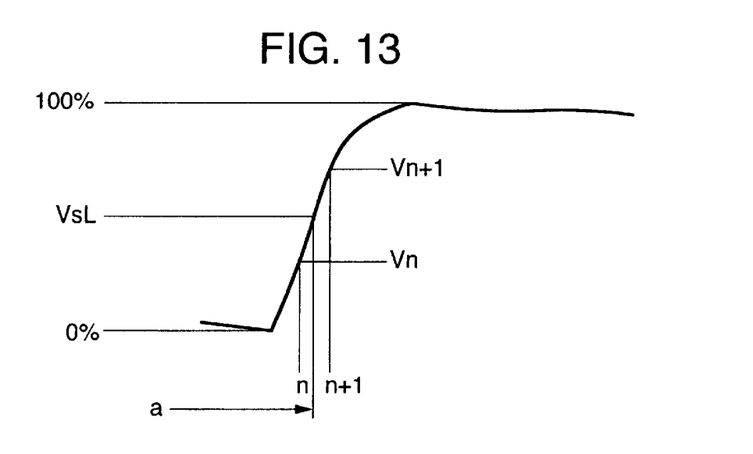
FIG. 13 is a diagram for explaining a method of expressing pixel positions to obtain length of an object to be measured.

Positions of the pixels are obtained as follows. In general, it is impossible to obtain a position or an area smaller than a pixel. In this case, such a position is determined using a luminance level ratio. This will be described by referring to FIG. 13. Assume that a position of an a-th pixel is determined in FIG. 13. When luminance equivalent to a luminance level 53 (VsL of FIG. 4) is between an n-th pixel and an (n+1)-th pixel, luminance levels respectively of pixels at the n-th and (n+1)-th positions are assumed to be Vn and Vn+1. The position of the a-th pixel can be approximated as follows. Position of a-th pixel=n+(Vn−VsL)/(Vn−Vn+1) where, n indicates a pixel position and is a positive integer, Vn and Vn+1 are luminance levels attained from a video camera, and Vsl is a luminance level of 50%. FIG. 8 shows results of contour positions of the pixels 61 to 63 determined in the method.

FIG. 8 shows results of contour positions of the pixels 61 to 63 determined in the method. FIG. 8 shows a relationship between a horizontal order m and contour positions Sm in the registration range E.

Figure 9:
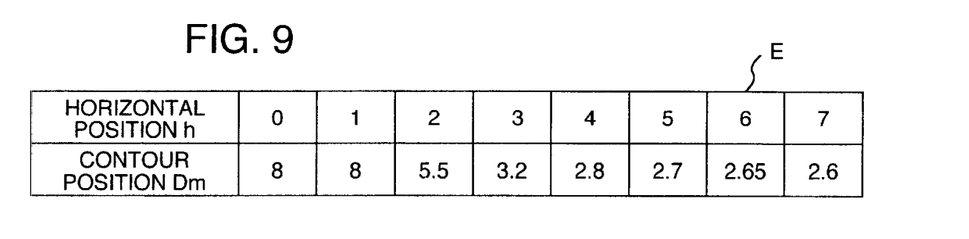
FIG. 9 is another table for explaining the embodiment of FIG. 1.

As can be seen from FIG. 8, in the registration range E, a contour position m1 (FIG. 6B) is at a 5.5-th pixel from above, m2 is at a 3.2-th pixel, and m3 is at a 2.8-th pixel. In a similar way, FIG. 9 shows a contour position Dm with respect to a horizontal position h in the detection range F. In FIG. 9, the horizontal position h corresponds to positions h0 to h7 of FIG. 6B. Although no contour line exists for h0 and h1, a maximum value of "8" is set.

The reference patterns are set to the registration range E and the detection range F as above and the teaching is thereby terminated.

2. Measurement and Inspection

Figure 10:
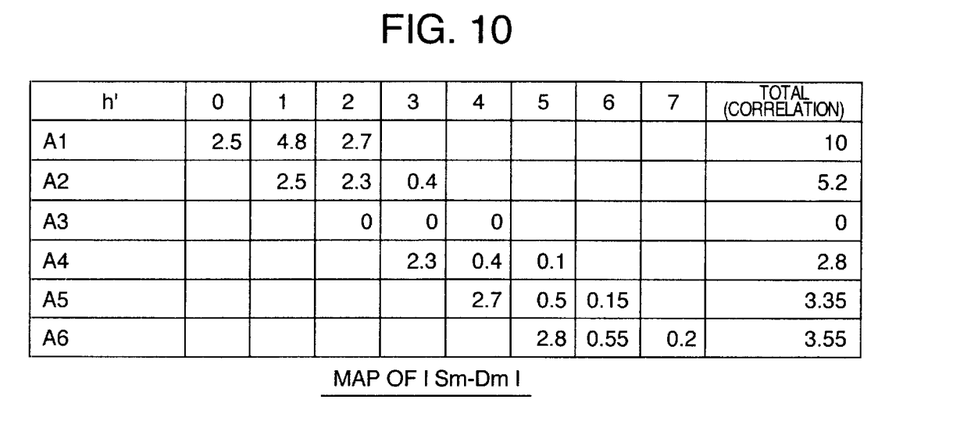
FIG. 10 is a map for explaining the embodiment of FIG. 1.

Referring to FIG. 10, description will be next given of a pattern matching step between the reference pattern obtained by the teaching and an inspection object. FIGS. 8 and 9 are referred to respectively as a reference pattern and an inspection object in the description. FIG. 10 shows correlation between a contour of an image obtained from the inspection object and an image in the detection range F registered. A1 to A6 arranged in a vertical direction (generally represented as Ax, where x=1, 2, . . . ) are associated with a positional order of horizontal pixels and respectively indicate contour positions in the vertical direction. A value in a rectangle indicates an absolute value of difference between a contour position Sm registered by the teaching and a contour position Dm of the measurement object 25.

First, values of correlation are obtained between the inspection or measurement object 25 as the inspection object (FIG. 9) and the reference pattern (FIG. 8) set as above. As can be seen from FIGS. 8 and 9, the correlation values are obtained by determining an absolute-value difference Ah between the registered contour positions (FIG. 8) and the detection contour positions (FIG. 9).

That is, the correlation is obtained by sequentially and horizontally moving the contour position Dm in the inspection object 25 shown in FIG. 9 and the registered contour position Sm of FIG. 8 in a pixel-by-pixel manner. For example, by comparing horizontal positions 0, 1 and 2 of FIG. 9 with horizontal order 1, 2 and 3 of FIG. 8, there are obtained differences of horizontal contour positions 2.5, 4.8, and 2.7 as shown in a row A1 of FIG. 10. Thereafter, the correlation is attained by moving the registration range E in a pixel-by-pixel way. Details of the operation will be described later.

Next, the absolute-value differences are added to each other in the direction of h to calculate a sum of differences. FIG. 10 shows the sum of differences for each row. For a smallest sum, there is determined Ax which has the largest correlation and which is a contour position of the inspection or measurement object 25. In the case of FIG. 10, A3 is the contour position. Namely, the horizontal contour position can be recognized as the third position in the detection range F.

Therefore, a left-side contour position L=3 is determined to obtain a size W of the angle section of the object 25.

Figure 7:
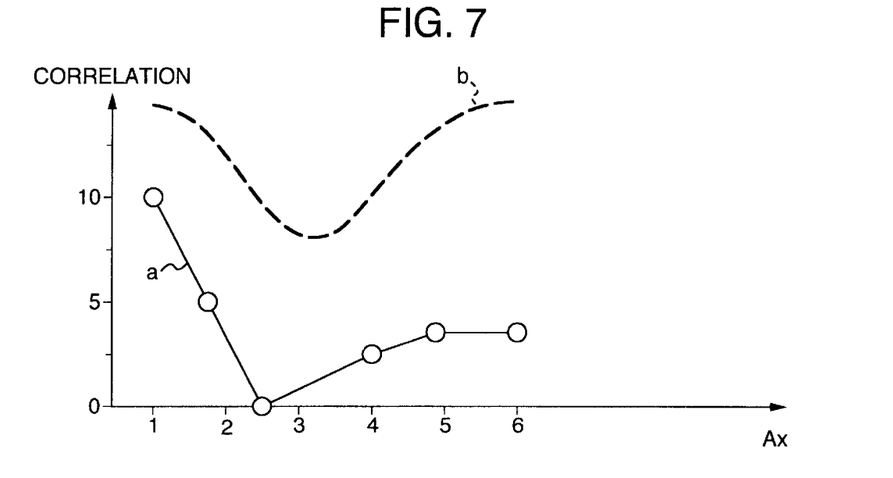
FIG. 7 is a graph for explaining an embodiment shown in FIG. 1 of the present invention.
Figure 11:
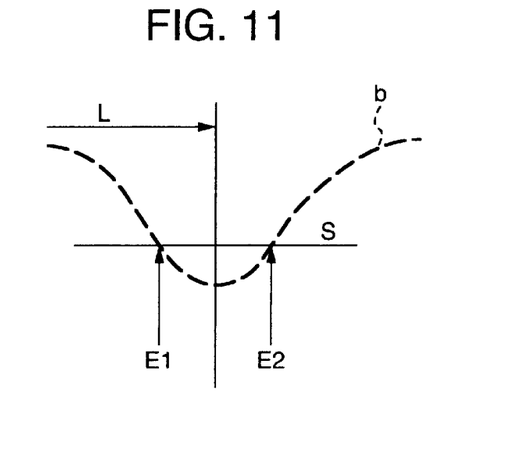
FIG. 11 is a graph for explaining an alternative method of obtaining contour positions in the embodiment of FIG. 1.

FIG. 7 shows a graph of a relationship between values of correlation and the absolute-value difference Ax in the horizontal direction. Since data of the reference pattern is employed as the inspection object 25 in the example, a real line a is drawn for the left-side size of the embodiment. That is, the data of the reference pattern is employed as the inspection object 25 in the example and hence the registered image is substantially identical to the image in the detection range. The graph indicates that the value of correlation takes a maximum value for Ax=0. However, in an actual measurement, data shown in FIG. 9 is data from the measurement or inspection object. Consequently, the image of FIG. 8 is similar to the registered image, but it is not completely equal to the registered image in ordinary cases. As a result, a graph of a dotted line b is obtained. In such a case, it is also possible that a threshold level S is set to the graph of the dotted line b as shown in FIG. 11 to determine E1 and E2. A contour position L can be obtained as L=(E2+E1)/2.

Figure 12:
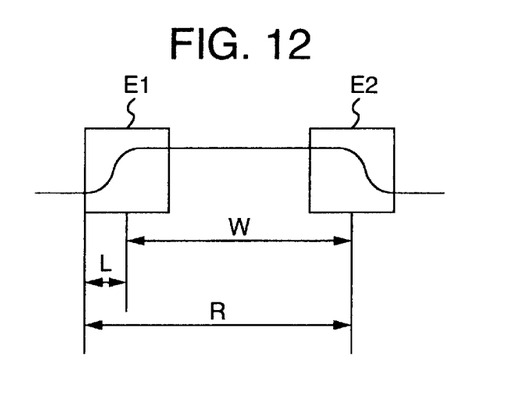
FIG. 12 is a diagram for explaining a method of obtaining length between edges in the embodiment of FIG. 1.

Subsequently, as shown in FIG. 12, there is obtained the size W between the registered corners E1 and E2 of two corner sections (patterns) determined on the object 25 by the pattern matching.

In the determination of the length W, the right-side contour position R of the right-side contour (registered range E2) can be obtained in almost the same procedure as for the position L. The size W is attained as $$W = k*(R-L)$$

where, k is a coefficient determined by the magnification factor of the optical system.

The size between the angle sections, i.e., the edge sections of the measurement object can be measured in this fashion.

It is possible to determine or identify a location having a highest value of correlation in the detection range of the image. However, two or more kinds of images in the registered range may be similar to the registered image. In this situation, the detection range must be beforehand made narrow.

When the size is obtained, it is determined whether or not the size is in a predetermined range, and acceptability of the measurement or inspection object is thereby determined. Reference data for the decision may be attained through a teaching step or predetermined design values may be beforehand set as data.

Although the system includes a high-resolution memory 42 in the description, the memory 42 can be dispensed with. It is naturally possible that the system appropriately functions with the frame memory 42 alone. In place of the high-resolution memory 42, a work memory may be disposed to store therein and to search for data necessary for the operation.

It is to be appreciated that the contour for which the correlation is obtained is not limited to a corner section.

In the description of the teaching and the inspection or measurement, contour pixels are extracted in a direction different from the size measuring direction of the measurement or inspection object as shown in FIG. 6. That is, the contour pixels are obtained in the form of contour positions Dm in a vertical direction at a horizontal position h. This however does not restrict the determination of contour positions. The contour may be naturally obtained in the form of contour positions in a horizontal direction at a vertical position. In this case, the operation may be conducted from either sides, i.e., the right and left sides.

Referring next to FIGS. 14A to 14C, 15, 16A to 16C, 17, and 18, description will be given of another embodiment of a size inspection or measurement method according to the present invention.

Figure 14A:
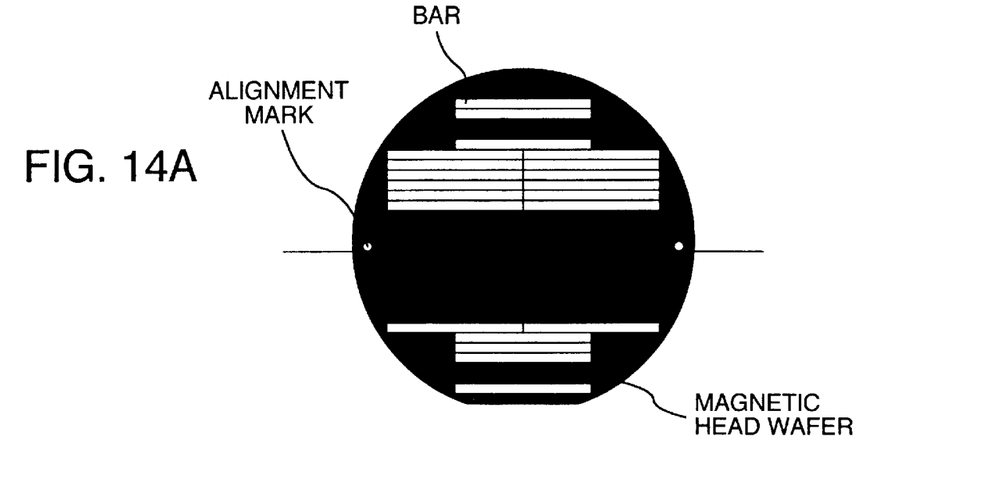
FIG. 14A is a diagram showing appearance of a wafer on which a plurality of bars each including a plurality of magnetic heads are formed.
Figure 14B:
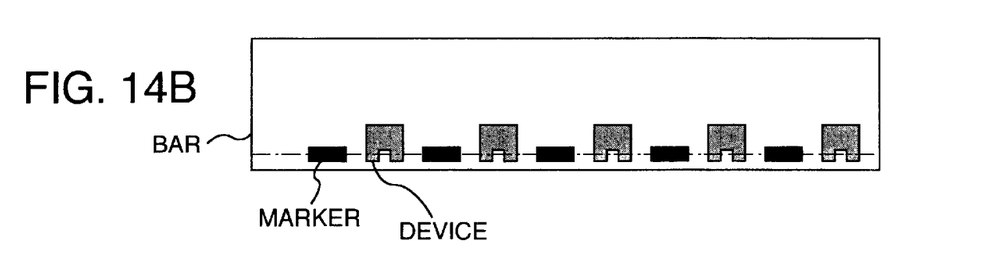
FIG. 14B is a diagram showing a cross-sectional view of a bar separated from the wafer of FIG. 14A.
Figure 14C:
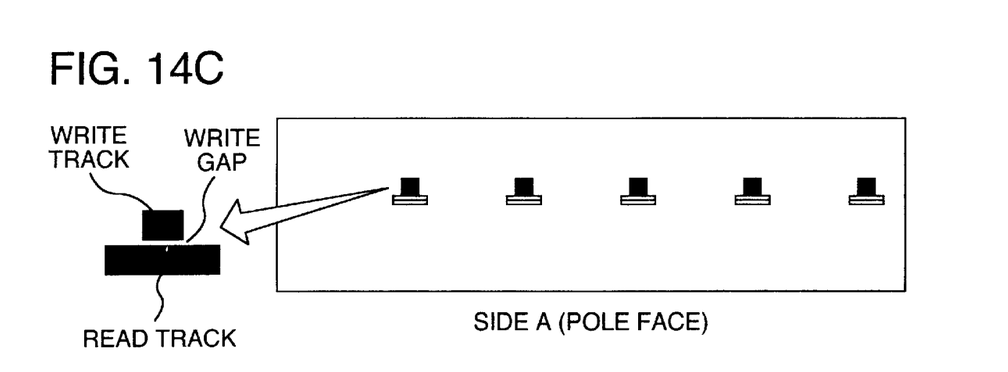
FIG. 14C is a diagram showing a cross-sectional view of magnetic heads arranged on the bar which is obtained by machining the bar shown in FIG. 14B.

FIGS. 14A to 14C show an outline of a production process of magnetic heads in which the magnetic heads are to be measured. As can be seen from FIG. 14A, magnetic heads are produced on wafers in an integrated device production process. A large number of magnetic heads are formed on each bar on a wafer. FIG. 14B shows one bar separated from the wafer. In the bar, magnetic head devices and positioning markers are formed in pair. The separated bar is lapped up to a position indicated by a broken line shown in FIG. 14B. After the lapping, measurement is conducted to determine fine sizes of each device of the bar. According to results of the measurement, acceptability of the device is determined. Thereafter, each magnetic head is cut away from the bar.

Figure 15:
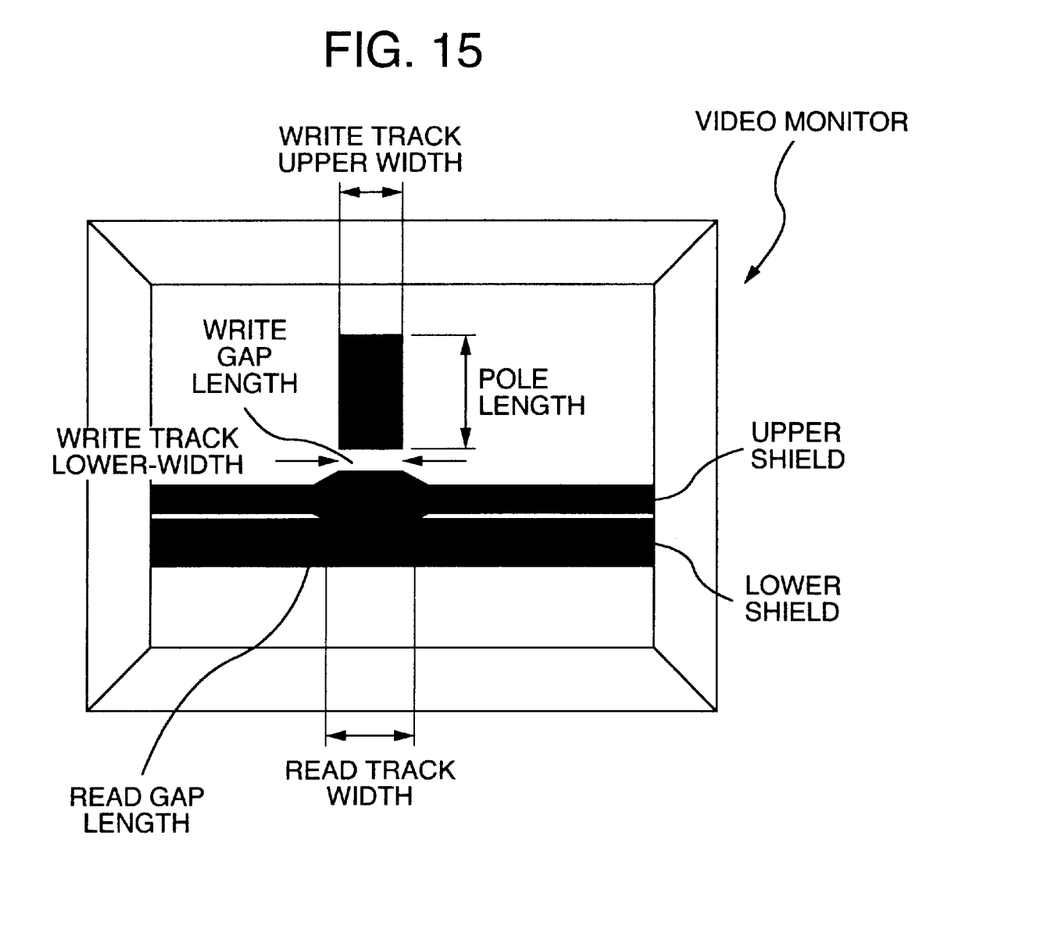
FIG. 15 is a magnified view of a magnetic head on a video monitor.

FIG. 15 schematically shows a magnified view of an image of a magnetic head displayed on a video monitor. However, an actual image obtained by an optical microscope is more obscure than the image of FIG. 15. As above, after the lapping step, measurement is conducted to determine fine sizes on a pole surface of each magnetic head of the bar. That is, gap length, track width, pole length, and the like are automatically measured at a time in a method of the present invention. Table 1 below shows an example of specifications of the measurement. As can be seen from Table 1, when various magnetic heads such as a GMR head are measured by an optical microscope, sizes of the measurement objects ranges in the order from submicrons to microns. This leads to a problem that a sharp image cannot be obtained because of limited performance of the optical microscope. However, according to the present invention, the measurement can be achieved in this order of size with high precision.

TABLE 1

| Item | Specification contents | Specification |
| --- | --- | --- |
| 1 | Measurement purpose | Magnetic head characteristic inspection |
| 2 | Gap length measurement repeatability | ±0.01 μm |

TABLE 1-continued

| Item | Specification contents | Specification |
| --- | --- | --- |
| 3 | Pole length measurement repeatability | ±0.01 μm |
| 4 | Track width measurement repeatability | ±0.02 μm |
| 5 | Shield width measurement width | 1~10 μm |
| 6 | Shield width measurement repeatability | ±0.01 μm |
| 7 | Measurement screen | About 24 μm × 18 μm |
| 8 | Measurement object | GMR/MR head Inductive head Various magnetic heads |

Figure 16A:
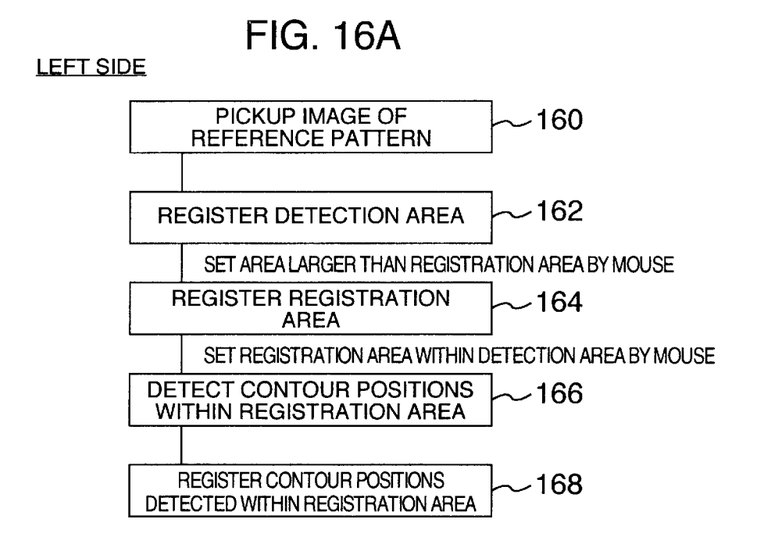
FIG. 16A is a flowchart showing operation in a teaching stage of a size inspection or measurement method of another embodiment according to the present invention.
Figure 17:
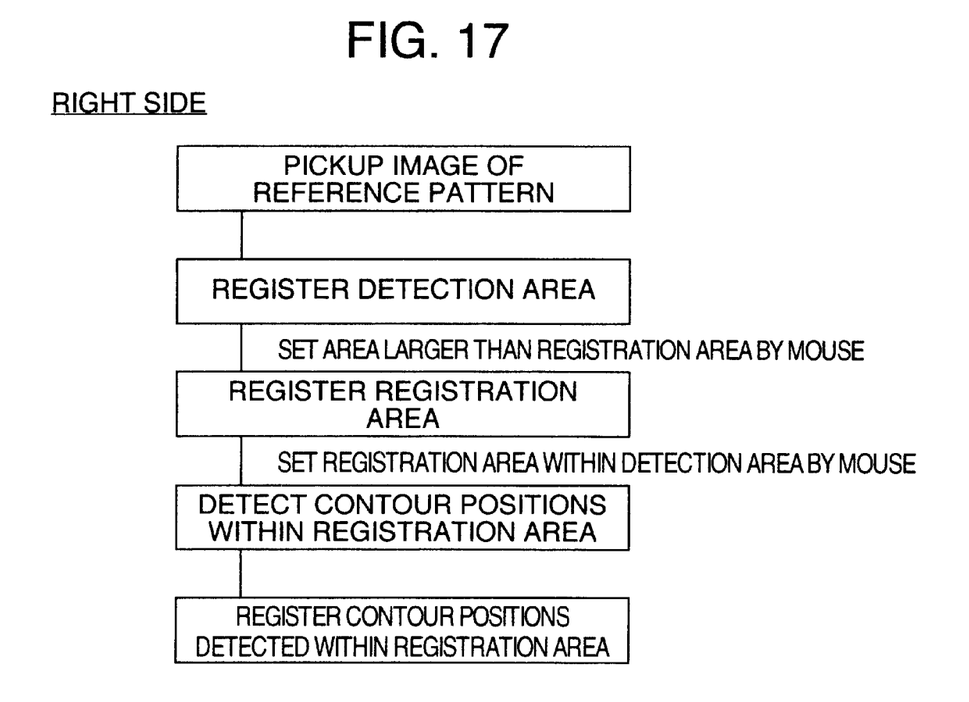
FIG. 17 is a flowchart showing operation in another teaching stage of a size inspection or measurement method of the embodiment of FIG. 16A.
Figure 18:
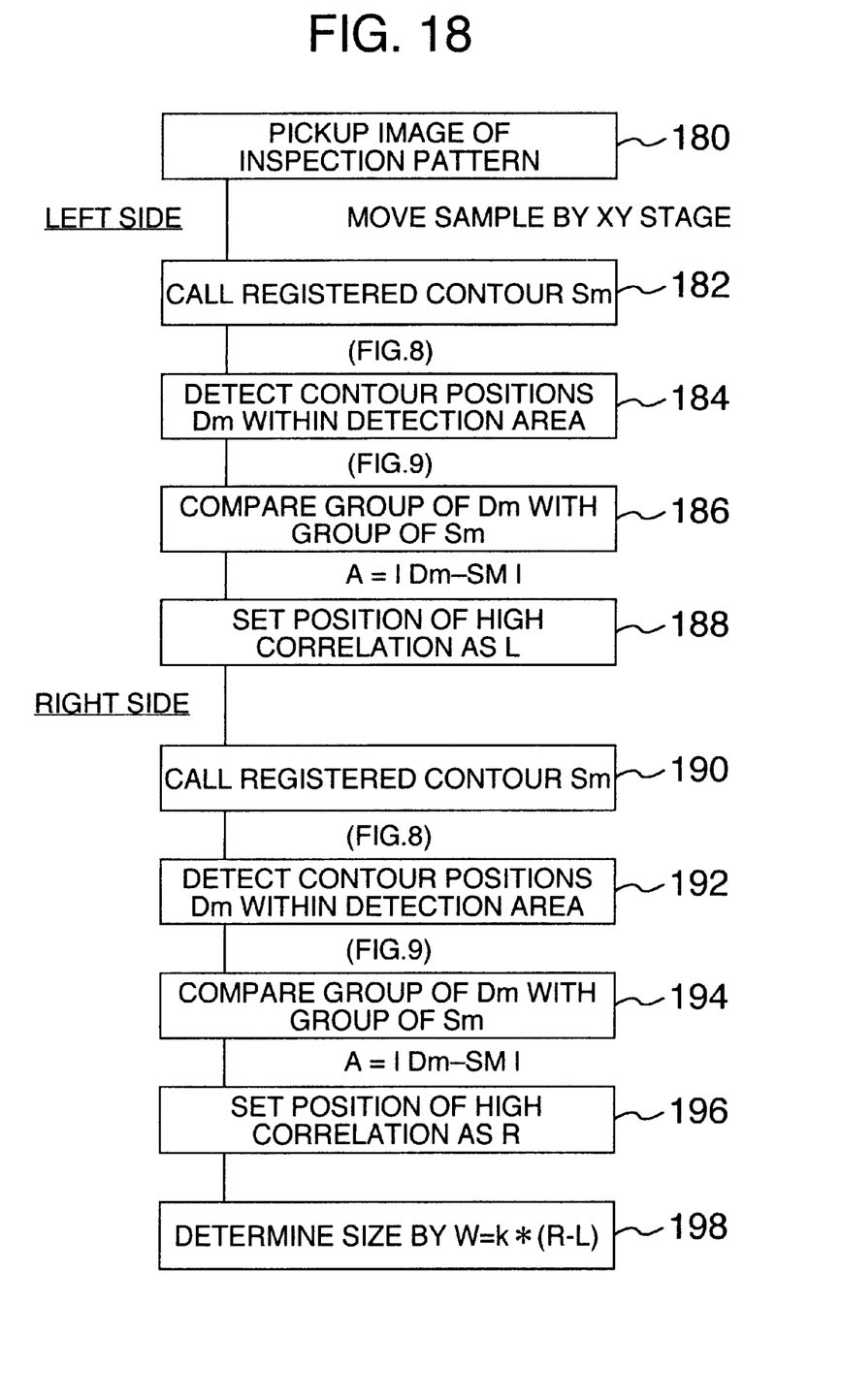
FIG. 18 is a flowchart showing operation in a size inspection or measurement stage of the size inspection or measurement method of the embodiment of FIG. 16A.

FIGS. 16A, 17, and 18 are flowcharts of processing to measure width of an object, for example, upper width of a write track shown in FIG. 15.

Figure 16B:
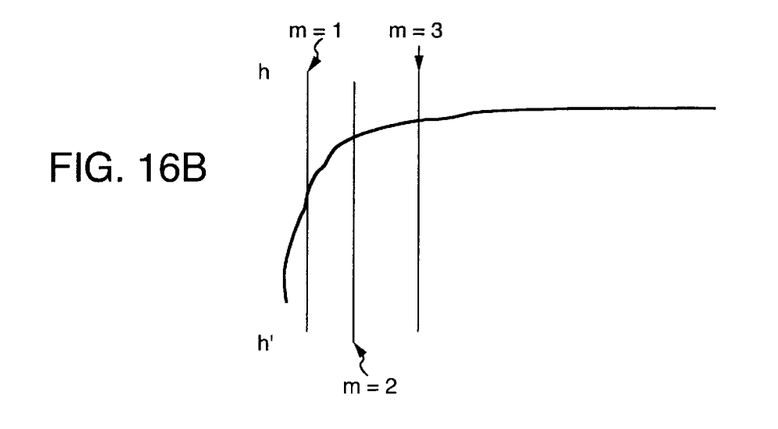
FIGS. 16B and 16C are diagrams to explain the flowchart of FIG. 16A.
Figure 16C:
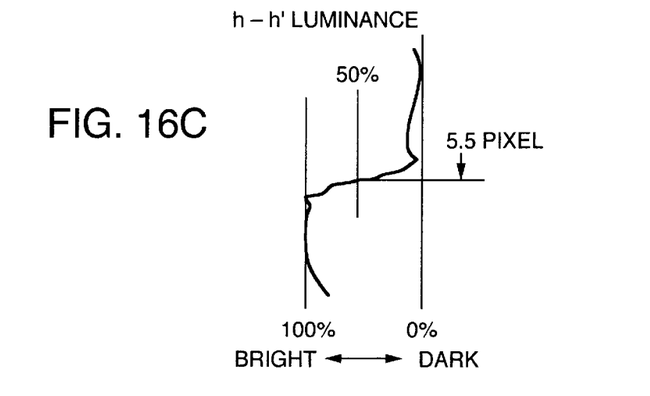

FIG. 16A shows in a flowchart a teaching step of a reference contour pattern of a left-side contour of an object. FIGS. 16B and 16C are diagrams for explaining detection of contour positions.

In FIG. 16A, an image of a reference pattern of a magnetic head is first picked up (step 160). Next, the user registers a detection range (area) by personally checking the reference pattern thus picked up (step 162). The detection range may be registered onto the high-resolution memory 42 or onto a work memory (not shown) disposed in place of the memory 42. As above, the user sets the detection range larger than a registration range (area) by using, for example, a mouse. In step 164, the user sets the registration range. In the operation, the user also operates the mouse to set the registration range within the detection range. Next, a group of contour positions are detected for a reference pattern within the registration range (step 166). The group of contour positions detected are registered to the main memory (step 168).

As can be seen from FIGS. 16B and 16C, contour positions are first detected on a line of pixels at m=1 in a vertical direction. Assume that on line h–h' for m=1, maximum luminance is 100% and minimum luminance is 0%. A position for a luminance of 50% is detected as a contour position. Resultantly, for example, in the case of FIGS. 6A and 6B, contour positions are detected as shown in FIG. 8. That is, the 5.5-th pixel is a contour position in the vertical direction at m=1, the 3.2-th pixel is a contour position in the vertical direction at m=2, and the 2.8-th pixel is a contour position in the vertical direction at m=3.

The setting of the registration range and the detection range and the measurement of the contour positions are carried out using an upper edge of the screen as a reference position.

FIG. 17 is a flowchart of a teaching operation of a reference contour pattern of a right-side contour section in the inspection or measurement location. The flowchart is substantially the same as that of the teaching of the reference contour pattern of the left-side contour section shown in FIG. 16A and hence description thereof will be avoided.

FIG. 18 is a flowchart of inspection or measurement processing.

In the flowchart, an inspection object pattern of an inspection object is first picked up (step 180). In the operation, the xy stage 6 moves the inspection object into a view field of the optical microscope. Next, a left-side corner section of the inspection pattern is processed as follows. First, a registered contour position Sm (FIG. 8) on the left side of the reference pattern is called or obtained (step 182). A contour position Dm (FIG. 9) of the inspection pattern is then detected within the detection range (step 184). A group of Dm is compared with a group of Sm (step 186) to attain A=|Dm−Sm|. The smaller A is, the higher the correlation between Dm and Sm is. A position at which the correlation takes a maximum value is set as L (distance from the left edge of the screen to the detection range; step 188).

The calculation of A=|Dm−Sm| is achieved in an example of FIGS. 6A, 6B, 8, 9, and 10 as follows.

Row A1: Differences between Dm for horizontal order h=0, 1, 2 and Sm for m=1, 2, 3;
Row A2: Differences between Dm for horizontal order h=1, 2, 3 and Sm for m=1, 2, 3;
Row A3: Differences between Dm for horizontal order h=2, 3, 4 and Sm for m=1, 2, 3;
•
•
•
Row A6: Differences between Dm for horizontal order h=5, 6, 7 and Sm for m=1, 2, 3.

The values of A1 are added to each other to obtain a sum of A1 in h-direction. This is repeatedly executed up to the row A6.

In the rows A1 to A6, the row A3 having a smallest sum (0 in FIG. 10) is a correlation point, and hence this point is set as a detected contour.

As a result, the left-side angle section, namely, the left-side contour section (edge section) of the inspection or measurement location of the inspection object is detected or identified.

Subsequently, operation is similarly conducted for the right-side corner section of the inspection pattern. That is, a registered contour position Sm (not shown) on the right side of the reference pattern is first obtained (step 190). A contour position Dm (not shown) of the inspection pattern is detected within the detection range (step 192). A group of Dm is compared with a group of Sm (step 194) to attain A=|Dm−Sm|. A position at which the correlation takes a maximum value is set as R (distance from the left edge of the screen to the detection range; step 196). By the processing, the right-side corner section, namely, the right-side corner section (edge section) of the inspection/measurement location of the inspection object is detected or identified. Thereafter, width W is calculated according to k*(R−L) (step 198).

In the description, the size inspection or measurement is conducted for only one position. It is to be appreciated that reference patterns of a plurality of size measurement positions can be registered in the teaching step to automatically inspect or measure such positions at a time.

As above, in accordance with the embodiments, length or width between particular contours can be measured, and the size can be obtained using an image produced by substantially the highest performance of the microscope, namely, an image whose size is in the order of almost a wavelength of light. The present invention is not limited to the measurement of width. Namely, it is possible to determine a place in an image, the position having a highest value of correlation with respect to a group of registered contours. The present invention is also applicable to the recognition of a position of the place.

The present invention leads to various advantages. For example, the contour is not limited to that of an corner section. By a contour teaching step and by setting a plurality of contour registration ranges, not limited to two ranges, it is possible to measure the width between more complex contours.

The specification and drawings are, accordingly, to be regarded in an illustrative rather than a restrictive sense. It will, however, be evident that various modifications and changes may be made thereto without departing from the scope of the invention as set forth in the claims.

What is claimed is:

1. A method of inspecting or measuring size of an object, comprising the steps of:
   setting contour registration areas of at least two locations of a reference object;
   detecting and registering contour positions of said reference object at each of said contour registration areas;
   setting an inspection area or a measurement area for an inspection or measurement object;
   registering contour positions of said inspection or measurement object within said inspection or measurement area of said inspection or measurement object;
   obtaining respective values of correlation between said contour positions of said inspection or measurement object and said contour positions of said reference object;
   detecting a position relating to the highest one of said values of correlation at each of said contour positions of said inspection or measurement object; and
   obtaining the size of the object based on the registered contour positions of said inspection or measurement object,
   wherein said steps of detecting contour positions of said reference object and registering said contour positions of said inspection or measurement object include the step of calculating a position of an a-th pixel as $$n+(Vn-VsL)/(Vn-Vn+1),$$

wherein VsL indicates a luminance level of the a-th pixel and is 50% of a maximum level, and Vn and Vn+1 indicate luminance levels of n-th and (n+1) pixels, respectively.

2. A method according to claim 1, wherein the step of setting said inspection area or said measurement area for said inspection or measurement object includes a step of setting an area which is larger than said inspection or measurement area for said inspection or measurement object.

3. A method according to claim 1, wherein the step of setting said contour registration areas of at least two locations of said reference object is a step of registering contour positions of a good sample.

4. A method according to claim 1, wherein the step of setting said contour registration areas of at least two locations of said reference object is a step of registering design values of said contour positions.

5. A method according to claim 1, wherein the step of detecting said position relating to the highest one of said values of correlation as the position of said inspection or measurement object is a step of comparing said contour positions registered of each said reference object with said contour positions of said inspection or measurement object and determining a position for highest correlation therebetween as a position of said inspection or measurement object.

6. A method according to claim 1, further comprising the step of:
   determining that the contour positions of said reference object and the said measurement object are respectively edge contour patterns.

7. A method according to claim 6, further including the step of measuring a distance between edge contour patterns of said at least two locations.

8. In an apparatus for inspecting or measuring sizes of an object, including an optical microscope, a two-dimensional sensor for converting an image of an object magnified by the optical microscope into an image signal, a display for displaying thereon an image of the image signal from said two-dimensional sensor, and an operating unit including a storage for processing the image signal, a method of inspecting or measuring the size of the object comprising the steps of:

setting, on said display, contour registration areas of at least two locations of a reference object and a measurement area of an inspection or measurement object;

detecting and registering, by said operating unit, contour positions of said reference object at each of said contour registration areas;

registering, by said operating unit, contour positions of said inspection or measurement object within said inspection or measurement area of said inspection or measurement object;

obtaining, by said operating unit, respective values of correlation between said contour positions of said inspection or measurement object and said contour positions of said reference object;

detecting, by said operating unit, a position for the highest one of the values of correlation at each of said contour positions of said inspection or measurement object; and     obtaining the size of the object based on the registered contour positions of said inspection or measurement object,     wherein said steps of detecting contour positions of said reference object and registering said contour positions of said inspection or measurement object include the step of calculating a position of an a-th pixel as $$n+(V_n-V_{sL})/(V_n-V_{n+1}),$$

wherein $V_{sL}$ indicate a luminance level of the a-th pixel and is 50% of a maximum level, and $V_n$ and $V_{n+1}$ indicate luminance levels of n-th and (n+1)-th pixels, respectively.

9. A method according to claim 8, wherein the contour positions of said reference object and said measurement object are edge contour patterns, respectively.

10. A method according to claim 9, wherein the contour positions of said reference object are edge contour patterns of a good sample.

11. A method according to claim 10, further comprising the step of:

measuring a distance between the edge contour patterns of said at least two locations.

\* \* \* \* \*